United States Patent [19]

Tsuchiya et al.

[11] Patent Number: 4,879,132

[45] Date of Patent: Nov. 7, 1989

[54] APPARATUS FOR INACTIVATION OF ENZYMES IN OIL SEEDS

[75] Inventors: Kanji Tsuchiya, Tokyo; Shizumi Ono, Chiba, both of Japan

[73] Assignee: Seikensha Company Limited, Tokyo, Japan

[21] Appl. No.: 890,641

[22] Filed: Jul. 30, 1986

Related U.S. Application Data

[62] Division of Ser. No. 708,850, Mar. 6, 1985, Pat. No. 4,630,534.

[51] Int. Cl.$^4$ ................................................. A23L 1/20
[52] U.S. Cl. ...................................... 426/634; 426/629
[58] Field of Search ................................. 426/629, 634

[56] References Cited

U.S. PATENT DOCUMENTS

| | | | |
|---|---|---|---|
| 3,901,978 | 8/1975 | Nelson | 426/634 |
| 3,966,992 | 6/1976 | Banks | 426/634 |
| 4,075,361 | 2/1978 | Oberg | 426/634 |
| 4,137,339 | 1/1979 | Kudo et al. | 426/634 |
| 4,409,256 | 10/1983 | Johnson et al. | 426/634 |

FOREIGN PATENT DOCUMENTS 3712055 of 1980 Japan ................................. 426/634

*Primary Examiner*—R. B. Penland
*Attorney, Agent, or Firm*—Browdy and Neimark

[57] ABSTRACT

A device for inactivating enzymes in soybeans comprises a generally air tight pressure cylinder having an axial screw which moves the soybeans from an upstream end to a downstream end where the inactivated soybeans are discharged. The screw has three zones, an upstream feed zone, a central agitation zone which runs about ½ the length of the pressure cylinder, and a downstream feed zone. A steam jacket is placed over the pressure cylinder especially in the area starting with the beginning of the agitation zone, and also an infeed pipe for the feeding therein of a buffer solution.

5 Claims, 2 Drawing Sheets

APPARATUS FOR INACTIVATION OF ENZYMES IN OIL SEEDS

This is a division of parent application Ser. No. 708,850, filed Mar. 6, 1985, now U.S. Pat. No. 4,630,534.

FIELD OF INVENTION

This invention relates to a method for thermally inactivating the enzymes, such as lipoxygenase, in oil seeds, which method is commonly used for the continuous production of liquid foods from oil seeds.

BACKGROUND OF THE INVENTION

Of known liquid foods obtained from oil seeds, soybean milk is the most common, the soybean being considered a kind of oil seed. There have been provided various proposals for the production of soybean milk from soybeans. However, soybean milk as produced by known methods is likely to become easily deteriorated in quality due to changes of surrounding conditions during storage, and such deterioration is accompanied by a disagreeable soybean odor, a roughness, a disagreeable bitterness, astringency, etc.

In addition, as soybean proteins are sensitive to heat and chemicals, the conventional techniques are often often unable to cope with unexpected difficulties which often occur in the production of an acceptable and stable soybean milk.

Many proposals have been made to solve these problems so that improved soybean milk can be made which is consistently stable against changes in the surrounding conditions and without deterioration of quality even after longer than normal storage, but none of these proposals has been particularly successful.

It has previously been proposed by one of the present inventors to provide a method for the production of liquid food from oil seeds which method includes inactivating the enzymes in said oil seeds, noting Japanese examined patent publication No. 56-44701, but it has been found that the liquid foods obtained according to such method are not sufficiently stable when changes in surrounding conditions occur, and the liqud foods obtained easily deteriorate in quality under such conditions.

SUMMARY OF THE INVENTION

Studies have now been conducted in order to solve the aforementioned problems and in order to produce liquid foods from oil seeds which are consistently stable even when surrounding conditions are adverse, and which liquid foods do not deteriorate in quality even when subjected to long storage. As a result, it has now been found that the method of said examined Japanese patent publication is not satisfactory because such method is not carried out in such a way as to sufficiently inactivate the oil seed enzymes which cause such problems.

It is therefore an object of the present invention to provide an improvement in the known process for the production of liquid foods from oil seeds.

A further object is to provide a process for the inactivation of enzymes, such as lipoxygenase in oil seeds, which enzymes are factors which generate disagreeable odors, bitterness, astringency, roughness, etc. in liquid foods of oil seeds such as soybean, which uses apparatus which may be installed in a controllable assembly of associated machinery used in the production of acceptable liquid foods such as oil seed milk from oil seeds.

Another object of the invention is to provide a method as part of overall process for producing liquid foods from oil seeds, which comprises (1) skinning the oil seeds, (2) removing the outer skins and refuse from the oil seeds, (3) said method of inactivating the enzymes contained in the skinned oil seeds, (4) grinding the enzyme-inactivated oil seeds to obtain an emulsion, (5) making the particles of the emulsion of finer size (6) removing unnecessary materials such as card refuse, i.e. undesired coagulated or caked fibrous materials, (7) deaerating and adjusting the product resulting from the preceding step while adding seasonings, (8) sterilizing and deodorizing the seasoned emulsion, (9) homogenizing the emulsion under high pressure conditions, (10) cooling the homogenized emulsion, and (11) packaging the cooled emulsion in an appropriate container under aseptic conditions.

DESCRIPTION OF EMBODIMENTS

Apparatus for carrying out the method of the invention for inactivation of the enzymes in oil seeds is constituted principally by a pressure cylinder on which is mounted an infeed hopper at the upstream end, and an exhaust pipe at the downstream end, the pressure cylinder being encircled by a jacket provided with a hot vapor supply pipe. The pressure cylinder is also provided with a buffer solution supply pipe and has therewithin a rotary screw which rotates about a rotary axis and which has a plurality of different screw sections. The first or most extreme section contains a conveying propeller screw; downstream in the middle portion is an agitation fan screw; and at the downstream end is a second conveying propeller screw.

The present apparatus may be employed solely for the purpose of inactivating the enzymes of oil seeds, especially lipoxygenase of soybeans, independently of other treatments required to produce liquid foods from oil seeds, particularly soybean milk from soybeans. However, the most preferred way of using the apparatus of this invention is in combination as part of a controllable assembly of continuously linked devices for the production of said liquid foods, particularly soybean milk.

Figure 1:
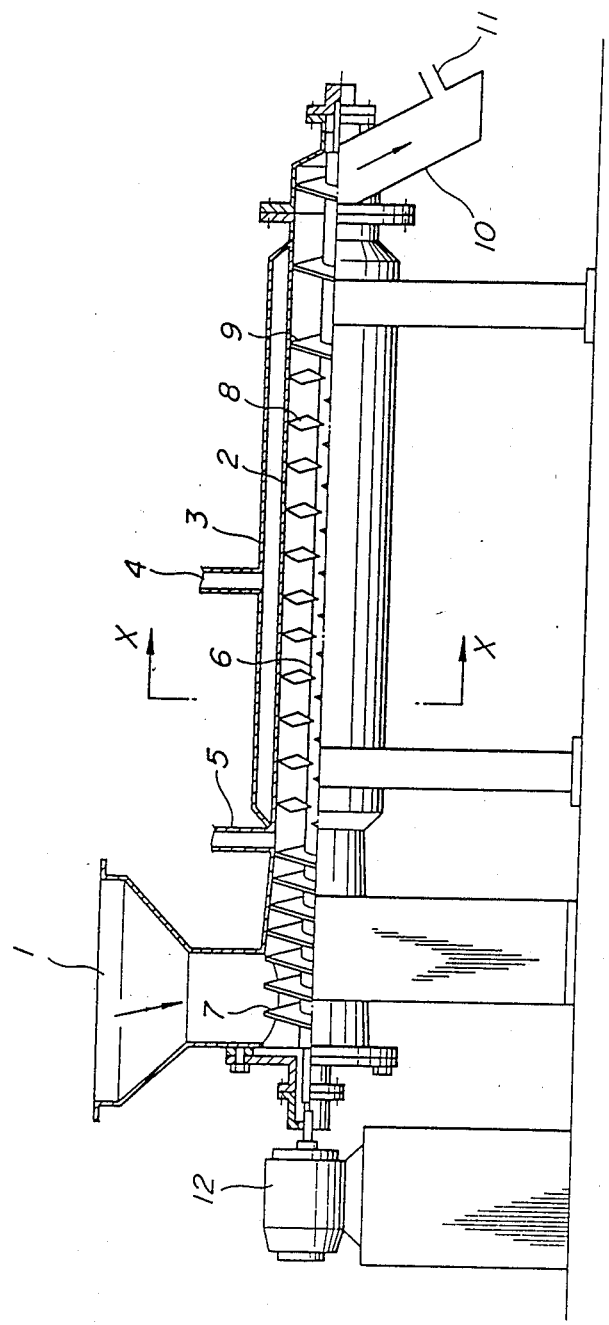
FIG. 1 is an elevational view, partly in section, of an apparatus in accordance with the invention.
Figure 2:
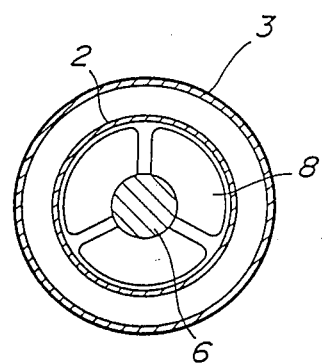
FIG. 2 is an sectional view taken along line X—X of FIG. 1.

With reference to FIG. 1 which shows a preferred embodiment of an apparatus for the inactivation of enzymes in oil seeds to produce liquid foods from oil seeds, particularly daily acceptable soybean milk from soybean according to the present invention, there is shown a hopper 1 to receive whole or skinned or ground raw materials, e.g. soybeans. The hopper in turn empties into the upstream or front end portion of a pressure cylinder 2 having an exhaust pipe 10 at its downstream end or back end portion for the discharge of enzymes-inactivated raw material.

The exhaust pipe 10 is provided with a hot water supply pipe 11 through which hot water is introduced from a service tank (not shown) and is preferably directly connected without an air gap to a downstream grinder of the closed type (not shown), the closed connection being to prevent the creation of an air jet in the grinder.

Surrounding most of the pressure cylinder is a pressure cylinder jacket 3 for providing heated fluid to the exterior of the pressure cylinder to thereby effect the heating thereof, the pressure cylinder 2 being closely mantled by the jacket 3 as illustrated. A suitable fluid supply pipe 4 is directly connected to the pressure cylinder jacket 3 for the infeed of heated vapor.

Immediately upstream of the pressure cylinder jacket 3 is provided a buffer solution supply pipe 5 which empties into the pressure cylinder 2. The buffer solution supply pipe 5 is provided with a switch valve (not shown) mounted to the front wall portion of the pressure cylinder 2, but which does not open into the pressure cylinder jacket 3. The buffer solution supply pipe 5 is disposed vertically as illustrated in FIG. 1, and is located at an axial position corresponding to ¼ the length of the rotary axis 6 measured from its front or input end.

Within the pressure cylinder 2 is provided a rotary axis horizontally supported by a bearing at one and another bearing at the other end, and connected to a drive motor 12 which effects the rotation of the rotary axis 6. Mounted on the rotary axis 6 at the upstream portion adjacent the hopper 1 is a conveying screw 7, and downstream therefrom, within that portion of the pressure cylinder 2 surrounded by the pressure cylinder jacket 3, is an agitation fan-like screw (hereinafter "fan screw") 8. Lastly, at the downstream end of the rotary axis 6 near the exhaust pipe 10 is a second conveying screw 9.

The conveying screw 7 on the rotary axis 6 is located at the upstream part of the rotary axis to a postion near, but not beyond, a downwardly extended tangent line of the outer wall of the buffer solution supply pipe 5. The outer circumference of the conveying screw 7 slidably touches the internal wall face of the pressure cylinder 2 such that the space formed by the internal wall face of the pressure cylinder 2 and the peripheral edge of the blade of the conveying screw 7 form together an air tight seal.

The conveying screw 9 is provided in the last ¼ length of the rotary axis 6 measured from the downstream end. As in the case of the conveying screw 7, similarly the conveying screw 9 slidably touches the internal wall face of the pressure cylinder 2 with the outer edge of its screw blade so that a generally air tight seal is formed between the two.

The center section of the rotary axis 6, constituting about ½ of the length thereof, is provided with the agitation screw 8 which desirably takes the form of a fan screw as shown in FIG. 1.

The scale of the pitch of each of the screw sections on the rotary axis, namely the conveying screw 7, the agitation fan screw 8 and the conveying screw 9, is such that the most upstream screw 7 has the smallest pitch and the most downstream screw 9 has the largest pitch, with the fan screw 8 in the middle having a pitch therebetween; the ratio of these pitches is desirably 1:2:3. The total length of the rotary axis is preferably not less than two meters.

The internal diameter of the pressure cylinder 2, corresponding to the outer diameter of the screws carried by the rotary axis 6, is preferably about two inches, i.e. about 5 cm.

Optionally, the wall of the pressure cylinder 2 may be perforated with a few pin holes over the surface of the pressure cylinder which lies within the jacket 3, each pin hole having a diameter of less than 1.5 mm. In this way, heated water vapor (steam) may be introduced to the material within the pressure cylinder to effect supplementary moistening and/or heating thereof.

As the buffer solution to be introduced through the buffer solution supply pipe, there may be used a non-toxic aqueous solution of sodium carbonate, sodium polyphosphonate or a mixture thereof with a pH value of 8 to 10, preferably 9.8.

In operation of the device according to the present invention for the inactivation of, for example, whole soybeans containing lipoxygenase, the whole soybean raw material having a moisture content of less than 20% and drained of free water, is introduced through the hopper 1 into the pressure cylinder 2 and gradually moved downstream by the action of the conveying screw 7. When the soybeans reach the area of the buffer solution supply pipe 5, they are placed under alkaline atmospheric conditions and begin to be agitated by the fan screw 8. At the same time, they enter that portion of the pressure cylinder surrounded by the jacket 3 and heated by steam through the water vapor supply pipe 4, whereby the temperature of the whole soybeans become elevated to 100°–110° C.

The rate of the moving raw materials in the pressure cylinder 2 is determined in accordance with the speed of revolution of the rotary axis 6, which may vary depending on the kind of raw material to be treated. In the case of whole soybeans it is preferred that the revolutional speed of the rotary axis be fixed so that the whole soybeans take 40–60 seconds from the time they reach the beginning of the agitation zone adjacent the upstream end of the fan screw 8 to the time when they are released from the downstream end of the conveying screw 9. In this way, the whole soybeans raw material is well heat-treated under pressure and under alkaline atmospheric condition without the sobyean proteinn becomming solidified mainly in the agitation zone, whereby the soybean enzymes, particularly lipoxygenase, become inactivated.

Alternatively, vapor may be introduced into the agitation zone through the pin holes provided in the wall of the pressure cylinder 2 lined with the jacket 3 in the case where it is necessary to have greater moisture in the agitation zone.

In operation of the apparatus of the present invention, the raw materials, particularly whole soybean, from which liquid foods are prepared, are heat-treated under pressure conditions and under alkaline atmospheric conditions while their water content is kept at about 20% by weight, whereby enzymes such as lipoxygenase in the raw material are effectively inactivated, such enzymes otherwise causing disagreeable odors, bitterness, astringency, roughness, etc. for liquid foods as produced and which lead to making such liquid foods unstable and easily deteriorated in quality.

What is claimed is:

1. A method for the inactivation of lipoxidase enzyme in oil seeds within an elongated pressure cylinder having a first zone, a second zone and a third zone, comprising feeding a product to be treated consisting essentially of whole or skinned oil seeds to the first zone of said elongated pressure cylinder and conveying said oil seeds within said pressure zone cylinder to said second zone thereof;

feeding a non-toxic buffer solution at a pH of about 8-10 to the interior of said elongated pressure cylinder at approximately the end of said first zone, said buffer solution providing an alkaline environment for said oil seeds;

subjecting said oil seeds to agitation and heating under pressure with steam in said second zone to effect a temperature of about 100°-110° C. of said oil seeds in said second zone, and effecting said agitation and heating under pressure in an alkaline environment in said second zone for a time sufficient to effect inactivation of lipoxidase enzyme in said oil seeds; and passing said oil seeds from said second zone into said third zone and then discharging the resultant enzyme-inactivated oil seeds from said elongated pressure cylinder.

2. A method according to claim 1 wherein said oil seeds are whole soybeans and said soybeans are conveyed through said second and third zones in about 40-60 seconds, and the water content of said soybeans is maintained at about 20% by weight.

3. A method according to claim 2 wherein said buffer solution is an aqueous solution of sodium carbonate, sodium polyphosphonate or a mixture thereof.

4. A method according to claim 1 wherein said buffer solution is an aqueous solution of sodium carbonate, sodium polyphosphonate or a mixture thereof.

5. A method according to claim 1 wherein said buffer solution has a pH value of about 9.8.

* * * * *